US008599249B2

United States Patent
Endo

(10) Patent No.: US 8,599,249 B2
(45) Date of Patent: Dec. 3, 2013

(54) STEREOSCOPIC IMAGE DISPLAY APPARATUS AND IMAGE DISPLAY SYSTEM THAT REDUCES BRIGHTNESS UNEVENNESS OF PROJECTED IMAGES BY CONTROLLING THE LIGHT LEVEL OF A LIGHT SOURCE

(75) Inventor: Takashi Endo, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 84 days.

(21) Appl. No.: 13/229,826

(22) Filed: Sep. 12, 2011

(65) Prior Publication Data
US 2012/0069163 A1 Mar. 22, 2012

(30) Foreign Application Priority Data
Sep. 21, 2010 (JP) ................... 2010-210518

(51) Int. Cl.
*H04N 13/04* (2006.01)
*H04N 9/47* (2006.01)

(52) U.S. Cl.
USPC .......................................................... 348/56

(58) Field of Classification Search
USPC ................................. 348/51, 53–56
See application file for complete search history.

(56) References Cited

U.S. PATENT DOCUMENTS 4,743,965 A * 5/1988 Yamada et al. ................. 348/43
8,233,035 B2 * 7/2012 Marcus et al. .................. 348/53
2009/0167845 A1 * 7/2009 Khan .............................. 348/51
2009/0237495 A1 9/2009 Kawahara
2010/0171818 A1 * 7/2010 Takatori ......................... 348/51
2010/0295929 A1 * 11/2010 Yoshifuji et al. ............... 348/53
2011/0115889 A1 * 5/2011 Kim et al. ...................... 348/56

FOREIGN PATENT DOCUMENTS

JP A-2009-232249 10/2009

OTHER PUBLICATIONS

Pierre Boher, Thierry Leroux, and Veronique Collomb-Patton Characterization of one Time-Sequential Stereoscopic 3D Display Apr. 17, 2010 Journal of Information Dispaly, vol. 11, No. 2, Jun. 2010 pp. 57-62.*

* cited by examiner

*Primary Examiner* — David Czekaj
*Assistant Examiner* — Mohammad J Rahman
(74) *Attorney, Agent, or Firm* — Oliff & Berridge, PLC

(57) ABSTRACT

An image display apparatus comprise: a light source section; a light modulator that modulates light delivered from the light source section to display an image; a light level control section that adjusts the amount of light delivered from the light source section to the light modulator; and a display control section that updates the image displayed on the light modulator during a first period and a second period alternately switched therebetween. The display control section updated in the first period to a first image and a black image in this order and updates in the second period to a second image and the black image in this order. The light level control section sets the amount of light delivered from the light source section to be greater than that in other periods during a predetermined switching period including a point to switch between the first period and the second period.

5 Claims, 7 Drawing Sheets

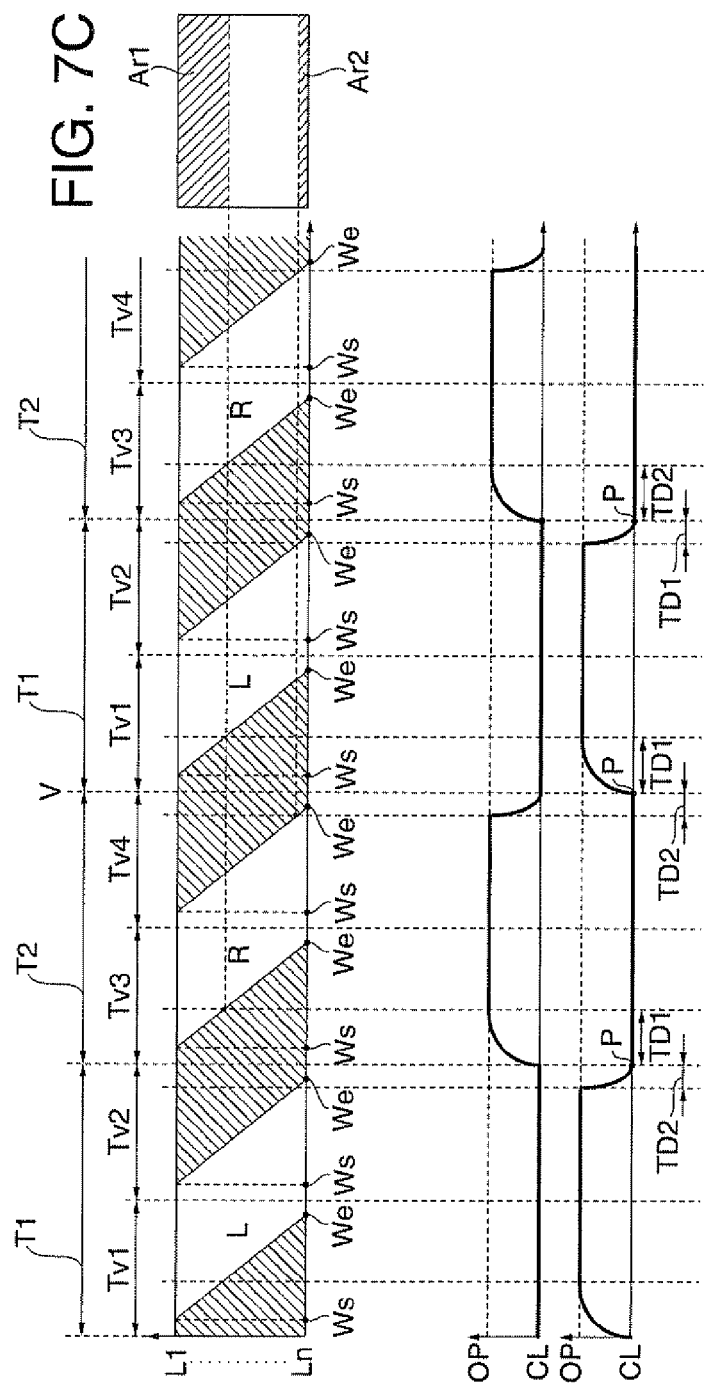

STEREOSCOPIC IMAGE DISPLAY APPARATUS AND IMAGE DISPLAY SYSTEM THAT REDUCES BRIGHTNESS UNEVENNESS OF PROJECTED IMAGES BY CONTROLLING THE LIGHT LEVEL OF A LIGHT SOURCE

BACKGROUND

1. Technical Field

The present invention relates to an image display apparatus and an image display system.

2. Related Art

There has been a known image display system (stereoscopic video image display apparatus) including an image display apparatus that displays an image and a pair of shutter glasses worn by a viewer and allowing the viewer to stereoscopically view the image displayed by the image display apparatus through the shutter glasses (see JP-A-2009-232249, for example).

FIGS. 7A to 7C describe the operation of an image display system of related art.

Specifically, FIG. 7A is a timing chart showing the timing when image data are written along each scan line produced by an image display apparatus, and the vertical axis corresponds to the vertical direction of the image display apparatus (the vertical axis represents the positions of the uppermost scan line L1 to the lowermost scan line Ln). FIG. 7B is a timing chart showing the timing when the states of a shutter for the left eye (lower part of FIG. 7B) and a shutter for the right eye (upper part of FIG. 7B) that form shutter glasses are switched between a light transmitting state OP and a light blocking state CL. FIG. 7C shows an image visually recognized through the shutter glasses during a second period T2.

In FIG. 7A, to diagrammatically show the timing when image data are written along the scan lines L1 to Ln, a straight line is drawn to connect a write start timing (update start timing) Ws, when image data start being written along the scan line L1, to a write end timing (update end timing) We, when the image data stop being written along the scan line Ln. It is noted that images displayed by the image display apparatus are labeled with characters as follows: An image for the left eye is labeled with "L"; an image for the right eye is labeled with "R"; and a black image is hatched (a parallelogram area represents each of the images described above) for ease of description.

The image display apparatus described in JP-A-2009-232249 is formed of a liquid crystal display that displays an image in a line sequential drive scheme. The liquid crystal display writes image data sequentially from the uppermost scan line L1 to the lowermost scan line Ln during each of vertical scan periods Tv1 to Tv4, which are specified by a vertical sync signal to update a displayed image, as shown in FIG. 7A. The liquid crystal display updates the displayed image during a first period T1 (vertical scan periods Tv1 and Tv2) and a second period T2 (vertical scan periods Tv3 and Tv4), which are alternately switched therebetween. Specifically, the displayed image is switched to an image for the left eye and a black image in this order during the first period T1, and the displayed image is switched to an image for the right eye and another black image in this order in the second period T2.

Each of the shutter glasses (shutter for left eye and shutter for right eye) described in JP-A-2009-232249 is formed of what is called a liquid crystal shutter. The shutter glasses are so configured that the state of the shutter for the left eye is switched to a light blocking state CL, in which substantially the entire amount of light is blocked, and the state of the shutter for the right eye starts being switched to a light transmitting state OP, in which substantially the entire amount of light is transmitted, at a switching point P when a first period T1 is switched to a second period T2, as shown in FIG. 7B. The shutter glasses are further so configured that the state of the shutter for the left eye starts being switched to the light transmitting state OP and the state of the shutter for the right eye is switched to the light blocking state CL at a switching point P when a second period T2 is switched to a first period T1.

That is, inserting a black image between an image for the left eye and an image for the right eye prevents images for the left and right eyes from overlapping with each other and allows the viewer to visually recognize the displayed image (image for left eye and black image) only with the left eye during a first period T1. The viewer then visually recognizes the displayed image (image for right eye and black image) only with the right eye during a second period T2. The viewer therefore stereoscopically views the displayed images with the aid of parallax.

Since each of the shutters for the left and right eyes relies on the liquid crystal technology, there is a light blocking to transmitting transition period TD1 resulting from the response speed of liquid crystal molecules, a period required to achieve the light transmitting state OP after the state of the shutter starts being switched to the light transmitting state OP, as shown in FIG. 7B.

Similarly, there is a light transmitting to blocking transition period TD2, a period required to achieve the light blocking state CL after the state of the shutter starts being switched to the light blocking state CL.

Since the light blocking to transmitting transition period TD1 and the light transmitting to blocking transition period TD2 are present, for example, at the start and end of a second period T2, the transmittance of the shutter for the right eye becomes lower than that in the other periods.

An image visually recognized through the shutter glasses during the second period T2 therefore has the following problem: The brightness of upper and lower areas Ar1, Ar2 is lower than that of the other areas due to the light blocking to transmitting transition period TD1 and the light transmitting to blocking transition period TD2, as shown in FIG. 7C. That is, the visually recognized image suffers from brightness unevenness. An image visually recognized through the shutter glasses during a first period T1 has the same problem.

SUMMARY

An advantage of some aspects of the invention is to provide an image display apparatus and an image display system that allow a viewer to visually recognize an image having a reduced amount of brightness unevenness.

An image display apparatus according to an aspect of the invention includes: a light source section, a light modulator that modulates light delivered from the light source section to display an image, a light level control section that adjusts the amount of light delivered from the light source section to the light modulator, and a display control section that updates the image displayed on the light modulator during a first period and a second period alternately switched therebetween in such a way that the displayed image is updated in the first period to a first image and a black image in this order and the displayed image is updated in the second period to a second image and the black image in this order. The light level control section sets the amount of light delivered from the light source section to be greater than that in other periods during a predetermined switching period including a point when the first period is switched to the second period and vice versa.

In the aspect of the invention, the light level control section temporarily sets the amount of light delivered from the light source section (hereinafter referred to as a light source light level) to be greater than that in other periods during a predetermined switching period including a point when the first period is switched to the second period and vice versa.

As a result, for example, when a viewer visually recognizes displayed images through a pair of liquid crystal shutter glasses, a decrease in transmittance of the liquid crystal shutter glasses due to a light blocking to transmitting transition period and a light transmitting to blocking transition period can be compensated by the increase in light source light level. That is, in an image visually recognized through the liquid crystal shutter glasses, the brightness of upper and lower areas can be improved by the increase in light source light level, whereby brightness unevenness can be suppressed.

An image display system according to another aspect of the invention includes: a pair of shutter glasses the state of which is switched between a light transmitting state in which light is transmitted and a light blocking state in which light is blocked and the image display apparatus described above.

In this aspect of the invention, since the image display system includes the image display apparatus described above, the same advantageous effect provided by the image display apparatus described above can be provided as well.

In the image display system according to the aspect of the invention, the image display apparatus preferably further includes a period information storage section that stores light transmitting period information on a light blocking to transmitting transition period from the timing when the shutter glasses start switching the state thereof to the light transmitting state to the timing when the light transmitting state is achieved and light blocking period information on a light transmitting to blocking transition period from the timing when the shutter glasses start switching the state thereof to the light blocking state to the timing when the light blocking state is achieved and a shutter control section that controls the operation of the shutter glasses. The shutter control section preferably starts switching the state of the shutter glasses to the light transmitting state at the switching point and starts switching the state of the shutter glasses to the light blocking state based on the light blocking period information in such a way that the switching to the light blocking state is completed at the switching point. The light level control section preferably sets the switching period based on the light transmitting period information and the light blocking period information.

In the above aspect of the invention, the light level control section sets the switching period, during which the light source light level is increased, based on the light transmitting period information and the light blocking period information stored in the period information storage section.

The light level control section can therefore appropriately set the period during which the transmittance of the shutter glasses becomes lower than that in the other periods due to the light blocking to transmitting transition period and the light transmitting to blocking transition period (switching period) and set the light source light level to be higher only during this period than those in the other periods.

Brightness unevenness of an image visually recognized through the shutter glasses can therefore be appropriately suppressed.

In the image display system according to the aspect of the invention, the image display apparatus preferably further includes a change information storage section that stores change information on temporal change in transmittance of the shutter glasses during the light blocking to transmitting transition period and the light transmitting to blocking transition period, and the light level control section preferably adjusts the amount of light delivered from the light source section based on the change information during the switching period.

The transmittance of the shutter glasses is variable but changes with time during the light blocking to transmitting transition period and the light transmitting to blocking transition period.

In the aspect of the invention, the light level control section adjusts the light source light level during the switching period based on the change information stored in the change information storage section.

As a result, any change in transmittance of the shutter glasses during the light blocking to transmitting transition period and the light transmitting to blocking transition period can be canceled by adjusting the light source light level, whereby brightness unevenness of an image visually recognized through the shutter glasses can be more reliably suppressed.

BRIEF DESCRIPTION OF THE DRAWINGS

The invention will be described with reference to the accompanying drawings, wherein like numbers reference like elements.

FIGS. 7A to 7C describe the operation of an image display system of related art.

DESCRIPTION OF EXEMPLARY EMBODIMENTS

First Embodiment

A first embodiment of the invention will be described below with reference to the drawings.

Configuration of Image Display System

Figure 1:
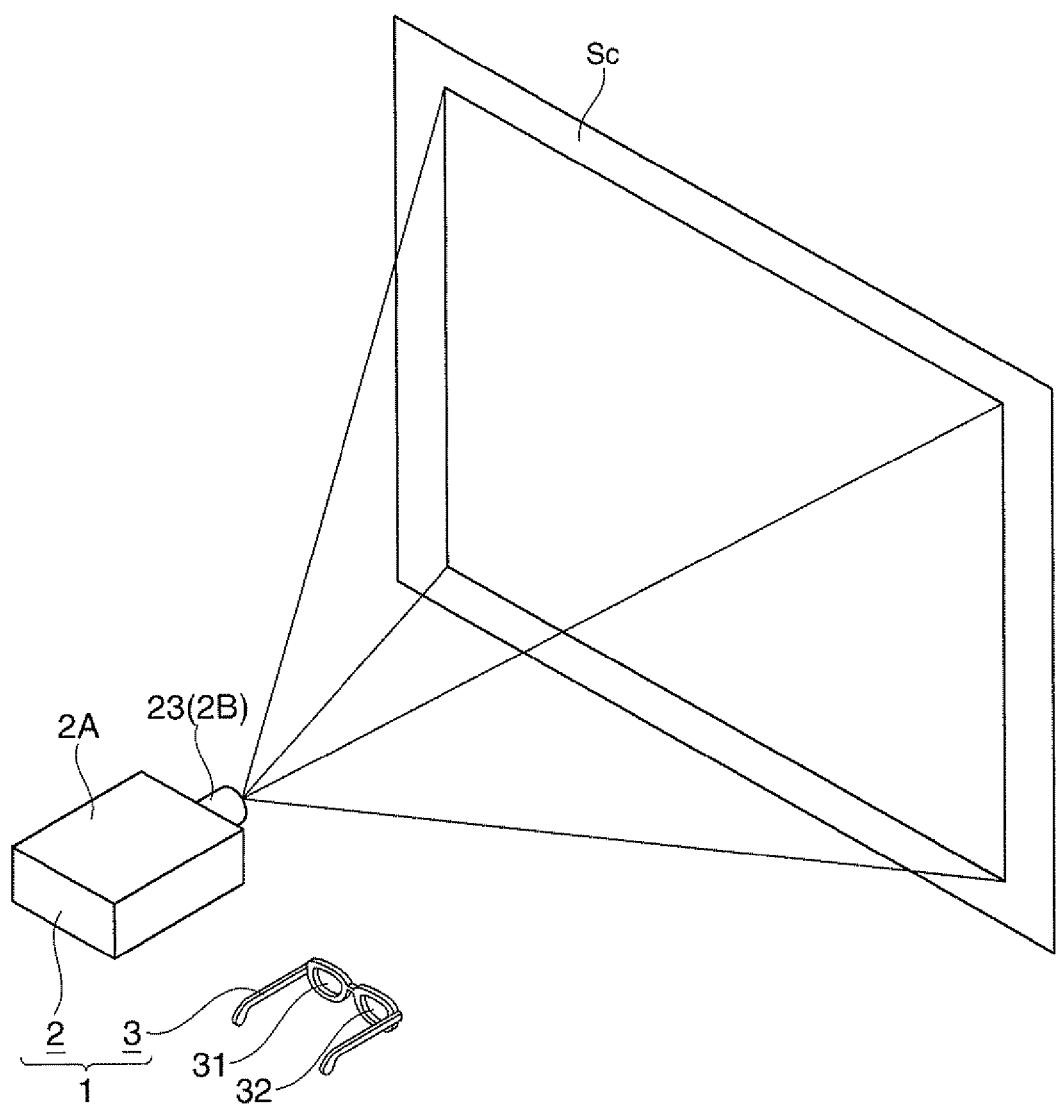
FIG. 1 is a perspective view showing how to use an image display system in a first embodiment.

FIG. 1 is a perspective view showing how to use an image display system 1.

Figure 2:
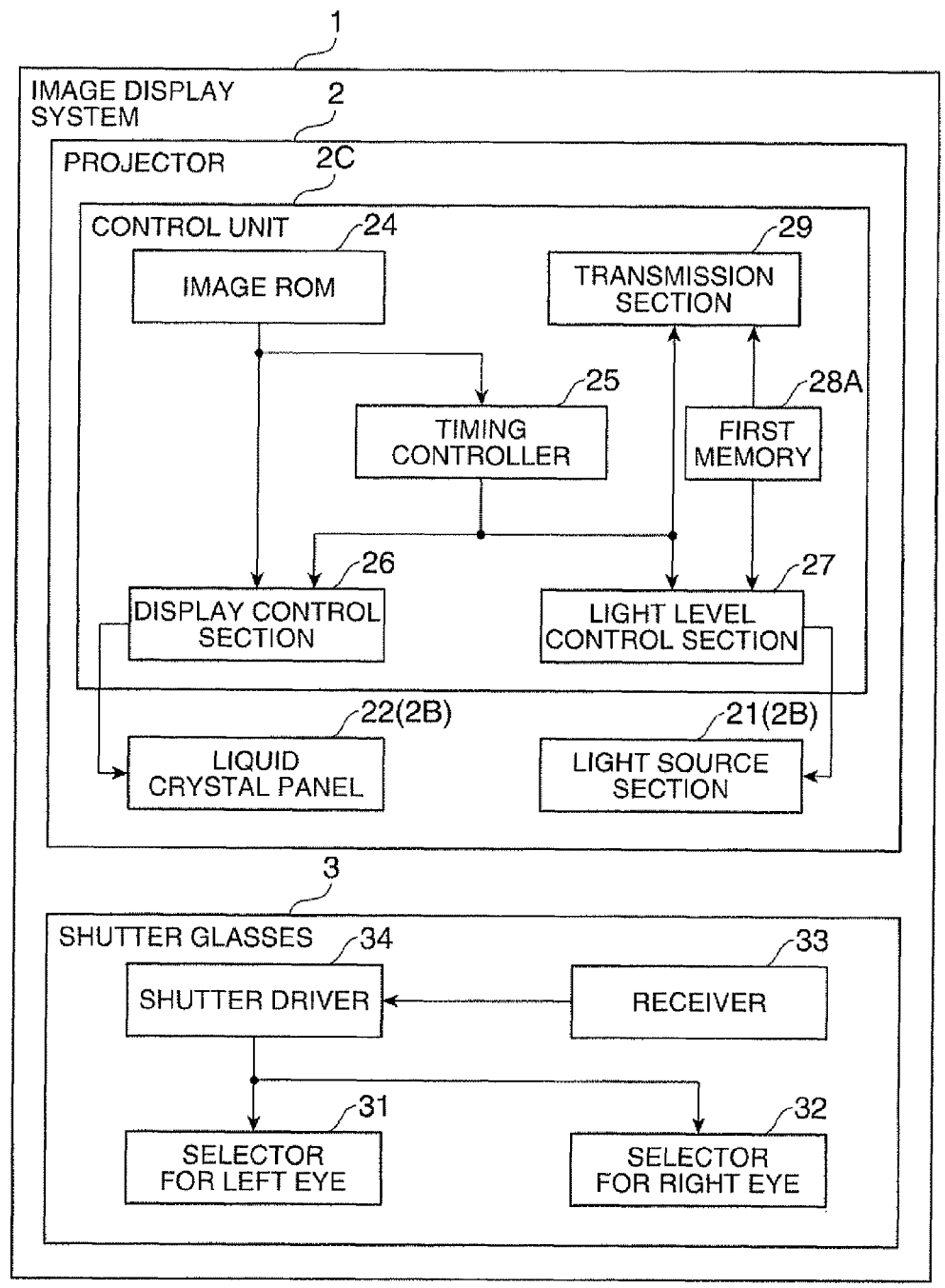
FIG. 2 is a block diagram diagrammatically showing the configuration of the image display system in the first embodiment.

FIG. 2 is a block diagram diagrammatically showing the configuration of the image display system 1.

The image display system 1 projects and displays an image on a reflective screen Sc (FIG. 1) and allows a viewer to view the projected image stereoscopically. The image display system 1 includes a projector 2 as an image display apparatus and a pair of shutter glasses 3, as shown in FIG. 1 or 2.

Configuration of Projector

The projector 2 forms an image based on image information (image data) and projects the image on the screen Sc. The projector 2 includes an exterior housing 2A, which forms the exterior (FIG. 1), and an optical unit 2B (FIG. 2) and a control unit 2C (FIG. 2) accommodated in the exterior housing 2A, as shown in FIG. 1 or 2.

The optical unit 2B, although not specifically shown, includes a light source section 21 including a light source lamp of discharge light emission type (FIG. 2), a liquid crystal panel 22 (FIG. 2) as a light modulator that modulates the light outputted from the light source section 21 to form an image, and a projection lens 23 that projects the image (FIG. 1).

The control unit 2C includes a CPU (central processing unit) and other components and controls the operation of the liquid crystal panel 22 and the shutter glasses 3. The control unit 2C includes an image ROM (read only memory) 24, a timing controller 25, a display control section 26, a light level control section 27, a first memory 28A as a period information storage section, and a transmission section 29 as a shutter control section, as shown in FIG. 2.

The image ROM 24 stores image data used by the liquid crystal panel 22 to form an image.

The image data is formed of left eye image data on an image for the left eye as a first image, right eye image data on an image for the right eye as a second image, and black image data on a black image. Each of the image data is formed of a set of data corresponding to a single frame.

The timing controller 25 reads sync signals (vertical sync signal, horizontal sync signal) contained in the image data stored in the image ROM 24 to establish synchronization among the display control section 26, the light level control section 27, and the transmission section 29.

Figure 3:
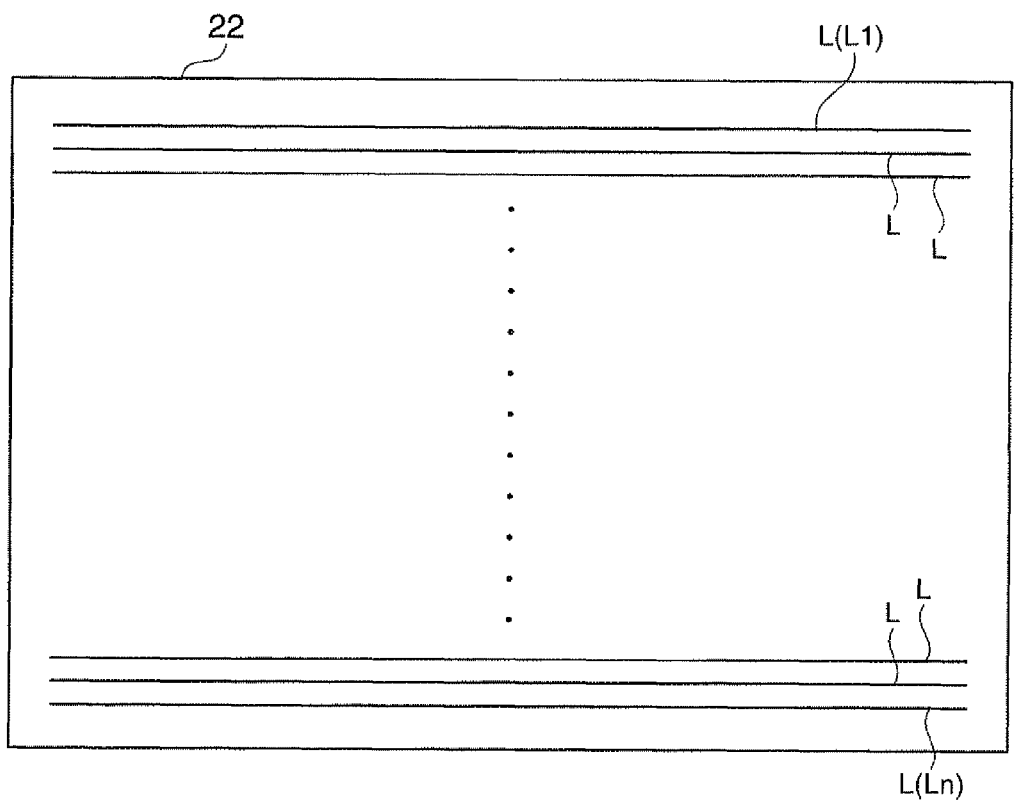
FIG. 3 describes how to drive a liquid crystal panel in the first embodiment.

FIG. 3 is a diagram for describing how to drive the liquid crystal panel 22.

The display control section 26 reads image data stored in the image ROM 24 as appropriate, performs predetermined processing on the image data, and drives the liquid crystal panel 22 in a line sequential manner to display age based on the image data.

Specifically, the display control section 26 writes image data on a pixel basis (applies voltage according to grayscale) sequentially from the uppermost scan line L (L1) to the lowermost scan line L (Ln) in the liquid crystal panel 22 in a vertical scan period based on the sync signals outputted from the timing controller 25, as shown in FIG. 3, to update the image displayed on the liquid crystal panel 22. The display control section 26 repeats the same processes described above in the next vertical scan period to update the current image to the next image.

The light level control section 27, for example, adjusts the magnitude of current supplied to the light source section 21 based on the vertical sync signal outputted from the timing controller 25 and information stored in the first memory 28A to adjust the amount of light delivered from the light source section 21 to the liquid crystal panel 22 (hereinafter referred to as light source light level).

The first memory 28A stores period information on the period during which the light level control section 27 adjusts the light source light level.

The period information will be described later.

The transmission section 29 transmits a control signal that switches the states of a selector for the left eye 31 and a selector for the right eye 32, which form the shutter glasses 3 and will be described later, between the light transmitting state and the light blocking state. The transmission section 29 transmits not only the control signal but also a signal representing the timing when the light transmitting state and the light blocking state are switched therebetween based on the vertical sync signal outputted from the timing controller 25 and the period information stored in the first memory 28A.

In the present embodiment, the transmission section 29, although not specifically shown, includes an infrared LED (light emitting diode) and a drive circuit that drives the infrared LED to emit light and transmits the signal described above by changing an emission period or an emission pattern of the infrared light.

Configuration of Shutter Glasses

The shutter glasses 3, which are worn by the viewer, includes the selector for the left eye 31, the selector for the right eye 32, a receiver (FIG. 2), and a shutter driver 34 (FIG. 2), as shown in FIG. 1 or 2.

Each of the selector for the left eye 31 and the selector for the right eye 32 is formed of what is called a liquid crystal shutter, and the state thereof is switched between the light blocking state, in which the selector blocks substantially the entire amount of light, and the light transmitting state, in which the selector transmits substantially the entire amount of light, when an ON signal (voltage is applied) or an OFF signal (voltage is not applied) is inputted.

In the present embodiment, each of the selector for the left eye 31 and the selector for the right eye 32 uses TN (twisted nematic) liquid crystal molecules, which provide the light blocking state when the ON signal is inputted whereas providing the light transmitting state when the OFF signal is inputted as described above.

Each of the selector for the left eye 31 and the selector for the right eye 32 has a light blocking to transmitting transition period TD1 (see FIGS. 4A to 4C) resulting from the response speed of the liquid crystal molecules, a period required to achieve the light transmitting state OP after the OFF signal is inputted (after the state of the selector starts being switched to the light transmitting state OP (see FIGS. 4A to 4C)).

Similarly, each of the selector for the left eye 31 and the selector for the right eye 32 has a light transmitting to blocking transition period TD2 (see FIGS. 4A to 4C), a period required to achieve the light blocking state CL after the ON signal is inputted (after the state of the selector starts being switched to the light blocking state CL (see FIGS. 4A to 4C)).

The first memory 28A described above in the projector 2 stores light transmission period information on the light blocking to transmitting transition period TD1 and light blocking period information on the light transmitting to blocking transition period TD2.

The receiver 33 receives the signals transmitted from the transmission section 29.

In the present embodiment, the receiver 33, although not specifically shown but includes an infrared light receiving device, receives the infrared light emitted from the transmission section 29, converts the received infrared light into a signal, and outputs the signal to the shutter driver 34.

The shutter driver 34 outputs the ON signal and the OFF signal to the selector for the left eye 31 and the selector for the right eye 32 based on the signal from the receiver 33 to switch the states of the selector for the left eye 31 and the selector for the right eye 32 between the light transmitting state and the light blocking state.

Operation of Image Display System

Figures 4A, 4B, 4C:
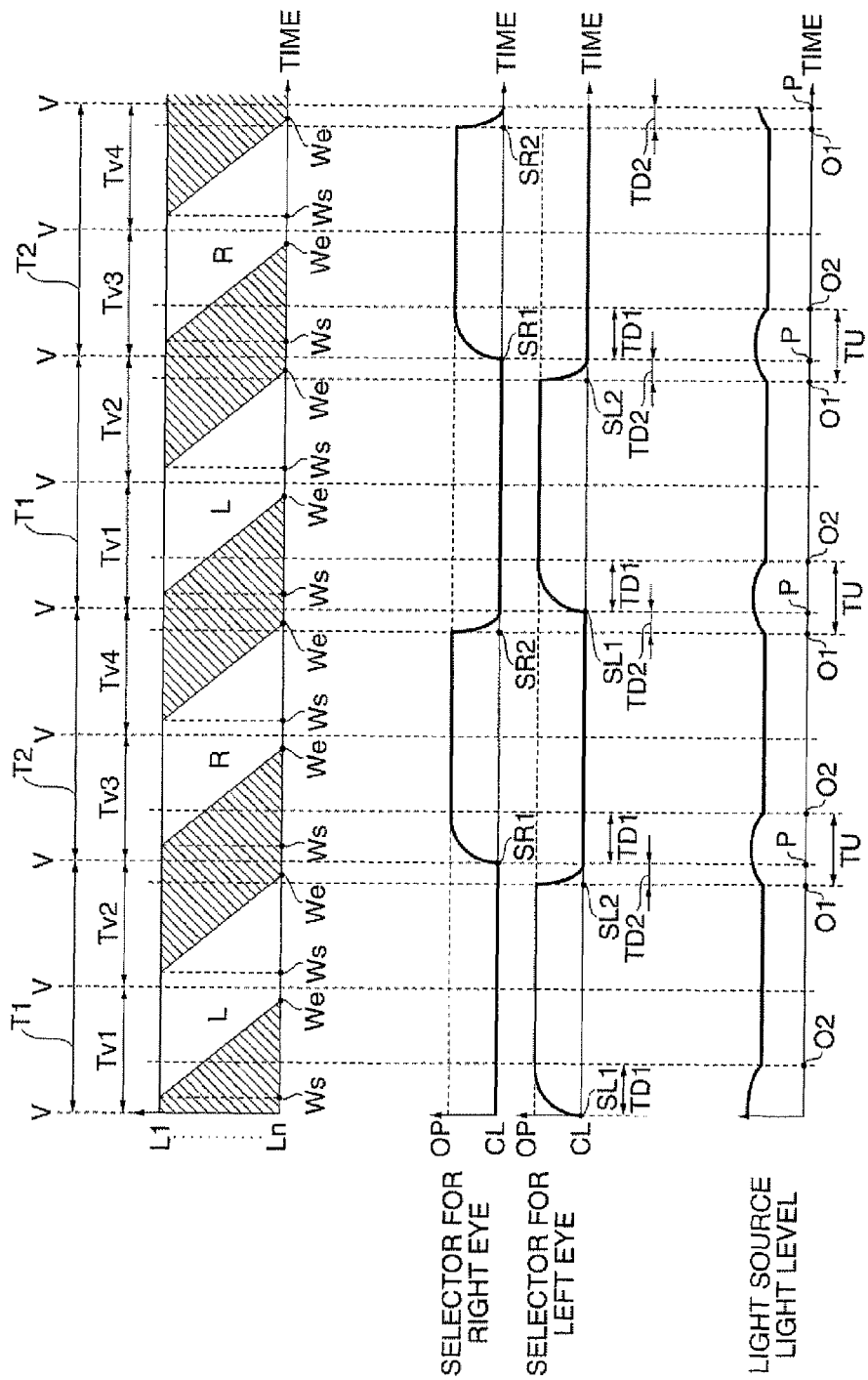
FIGS. 4A to 4C describe the operation of the image display system in the first embodiment.

FIGS. 4A to 4C describe the operation of the image display system 1.

Specifically, FIGS. 4A and 4B are timing charts similar to those in FIGS. 7A and 7B, and FIG. 4C is a timing chart whose vertical axis represents the light source light level.

The operation of the image display system 1 described above will next be described with reference to FIGS. 4A to 4C.

In the following sections, the operation of the image display system 1 will be described in the following order for ease of description: the operation of the display control section 26, the operation of the shutter glasses 3, and the operation of the light level control section 27.

Operation of Display Control Section

The display control section 26 updates the image displayed on the liquid crystal panel 22 whenever vertical scan periods Tv1 to Tv4 starts (every 1/240 (sec) in the present embodiment) to an image for the left eye, a black image, an image for the right eye, and a black image in this order, as shown in FIG. 4A. In other words, the display control section 26 updates the image displayed on the liquid crystal panel 22 in a first period T1 (vertical scan periods Tv1 and Tv2) and a second period T2 (vertical scan periods Tv3 and Tv4), which are alternately switched therebetween. That is, the displayed image is switched to an image for the left eye and a black image in this order in the first period T1, and the displayed image is switched to an image for the right eye and a black image in this order in the second period T2.

Specifically, the display control section 26 starts writing image data along the scan line L1 at a write start timing Ws, which is reached after a predetermined period (what is called a front porch period) elapsed since an output timing V when the timing controller 25 outputs the vertical sync signal and sequentially writes image data down to the scan line Ln to update the image displayed on the liquid crystal panel 22.

The transmission section 29 transmits not only the control signal for controlling the shutter glasses 3 but also the signal representing the timing when the states of the selector for the left eye 31 and the selector for the right eye 32 are switched between the light transmitting state OP and the light blocking state CL. The timing is set as follows.

First, as shown in the lower part of FIG. 4B, the transmission section 29 sets the timing when the state of the selector for the left eye 31 is switched between the light transmitting state OP and the light blocking state CL as follows.

That is, the transmission section 29 sets the timing when the state of the selector for the left eye is switched to the light transmitting state OP to be a timing SL1 that coincides with a point when a vertical scan period Tv1, during which the displayed image is updated to an image for the left eye, starts (output timing V when vertical sync signal is outputted).

The transmission section 29 further sets the timing when the state of the selector for the left eye is switched to the light blocking state CL to be a timing SL2 earlier than a point when a vertical scan period Tv3, during which the displayed image is updated to an image for the right eye, starts by the light transmitting to blocking transition period TD2 based on the light blocking period information stored in the first memory 28A.

Further, as shown in the upper part of FIG. 4B, the transmission section 29 sets the timing when the state of the selector for the right eye 32 is switched between the light transmitting state OP and the light blocking state CL as follows.

That is, the transmission section 29 sets the timing when the state of the selector for the right eye is switched to the light transmitting state OP to be a timing SR1 that coincides with a point when a vertical scan period Tv3, during which the displayed image is updated to an image for the right eye, starts.

The transmission section 29 further sets the timing when the state of the selector for the right eye is switched to the light blocking state CL to be a timing SR2 earlier than a point when a vertical scan period Tv1, during which the displayed image is updated to an image for the left eye, starts by the light transmitting to blocking transition period TD2 based on the light blocking period information stored in the first memory 28A.

Operation of Shutter Glasses

The shutter driver 34 recognizes the switching timings SL1, SR1, SL2, and SR2, when the states of the selector for the left eye 31 and the selector for the right eye 32 are switched between the light transmitting state OP and the light blocking state CL, based on the signal from the receiver 33.

The shutter driver 34 then outputs the OFF signal to the selector for the left eye 31 and the selector for the right eye 32 at the switching timings SL1 and SR1, respectively, as shown in FIG. 4B. That is, the selector for the left eye 31 and the selector for the right eye 32 start switching their states from the light blocking state CL to the light transmitting state OP at the switching timings SL1 and SR1, respectively.

The shutter driver 34 further outputs the ON signal to the selector for the left eye 31 and the selector for the right eye 32 at the switching timings SL2 and SR2, respectively, as shown in FIG. 4B. That is, the selector for the left eye 31 and the selector for the right eye 32 start switching their states from the light transmitting state OP to the light blocking state CL at the switching timings SL2 and SR2, respectively.

Since the selector for the left eye 31 starts switching its state to the light blocking state CL at the timing SL2, which is earlier than a point when a vertical scan period Tv3, during which the displayed image is updated to an image for the right eye, starts by the light transmitting to blocking transition period TD2, the operation of switching the state to the light blocking state CL has been completed when the vertical scan period Tv3 starts and the light blocking state CL is set from the beginning of the vertical scan period Tv3.

The operation of switching the state of the selector for the right eye 32 to the light blocking state CL is similarly completed when a vertical scan period Tv1, during which the displayed image is updated to an image for the left eye, starts and the light blocking state CL is set from the beginning of the vertical scan period Tv1.

Based on the operations described above, since the state of the selector for the left eye 31 is switched to the light transmitting state OP and the state of the selector for the right eye 32 is switched to the light blocking state CL during a first period T1, the images projected on the screen Sc (image for left eye and black image) are visually recognized only with the left eye of the viewer.

Further, since the state of the selector for the right eye 32 is switched to the light transmitting state OP and the state of the selector for the left eye 31 is switched to the light blocking state CL during a second period T2, the images projected on the screen Sc (image for right eye and black image) are visually recognized only with the right eye of the viewer.

The viewer therefore stereoscopically views the images projected on the screen Sc with the aid of parallax.

Operation of Light Level Control Section

The light level control section 27 sets a switching period TU during which the light source light level is increased (FIG. 4O) based on the vertical sync signal outputted from the timing controller 26 and the period information stored in the first memory 28A.

Specifically, the light level control section 27 sets an increase start timing, when the light source light level starts being increased, at a timing O1 earlier than a point P when the first period T1 is switched to the second period T2 and vice versa by the light transmitting to blocking transition period TD2 based on the light blocking period information, as shown in FIG. 4C.

The light level control section 27 further sets an increase end timing, when the light source light level stops being increased, at a timing O2 later than the switching point P by the light blocking to transmitting transition period TD1 based on the light transmitting period information.

The light level control section 27 then sets the light source light level higher than those in the other periods during the switching period TU from the increase start timing O1 to the increase end timing O2 including the switching point P, as shown in FIG. 4C.

The first embodiment described above provides the following advantageous effects.

In the present embodiment, the light level control section 27 temporarily sets the light source light level to be higher than those in the other periods during the predetermined switching period TU including the point when a first period T1 is switched to a second period T2 and vice versa.

As a result, when the viewer stereoscopically views projected images through the shutter glasses 3, a decrease in transmittance of the shutter glasses 3 due to the light blocking to transmitting transition period TD1 and the light transmitting to blocking transition period TD2 can be compensated by the increase in the light source light level. That is, in a projected image stereoscopically viewed through the shutter glasses 3, the brightness of the upper and lower areas Ar1, Ar2 (see FIG. 7C) can be improved by the increase in the light source light level, whereby brightness unevenness can be suppressed.

Further, the light level control section 27 sets the switching period TU, during which the light source light level is increased, based on the light transmitting period information and the light blocking period information stored in the first memory 28A.

The light level control section 27 can therefore appropriately set the period during which the transmittance of the shutter glasses 3 becomes lower than those in the other periods due to the light blocking to transmitting transition period TD1 and the light transmitting to blocking transition period TD2 (switching period TU) and set the light source light level to be higher only during the period TU than those in the other periods.

This configuration appropriately prevents brightness unevenness of a projected image stereoscopically viewed through the shutter glasses 3 from occurring.

Second Embodiment

A second embodiment of the invention will next be described with reference to the drawings.

In the following description, the same components and members as those in the first embodiment described above have the same reference characters, and descriptions of these components and members will be omitted or simplified.

Figure 5:
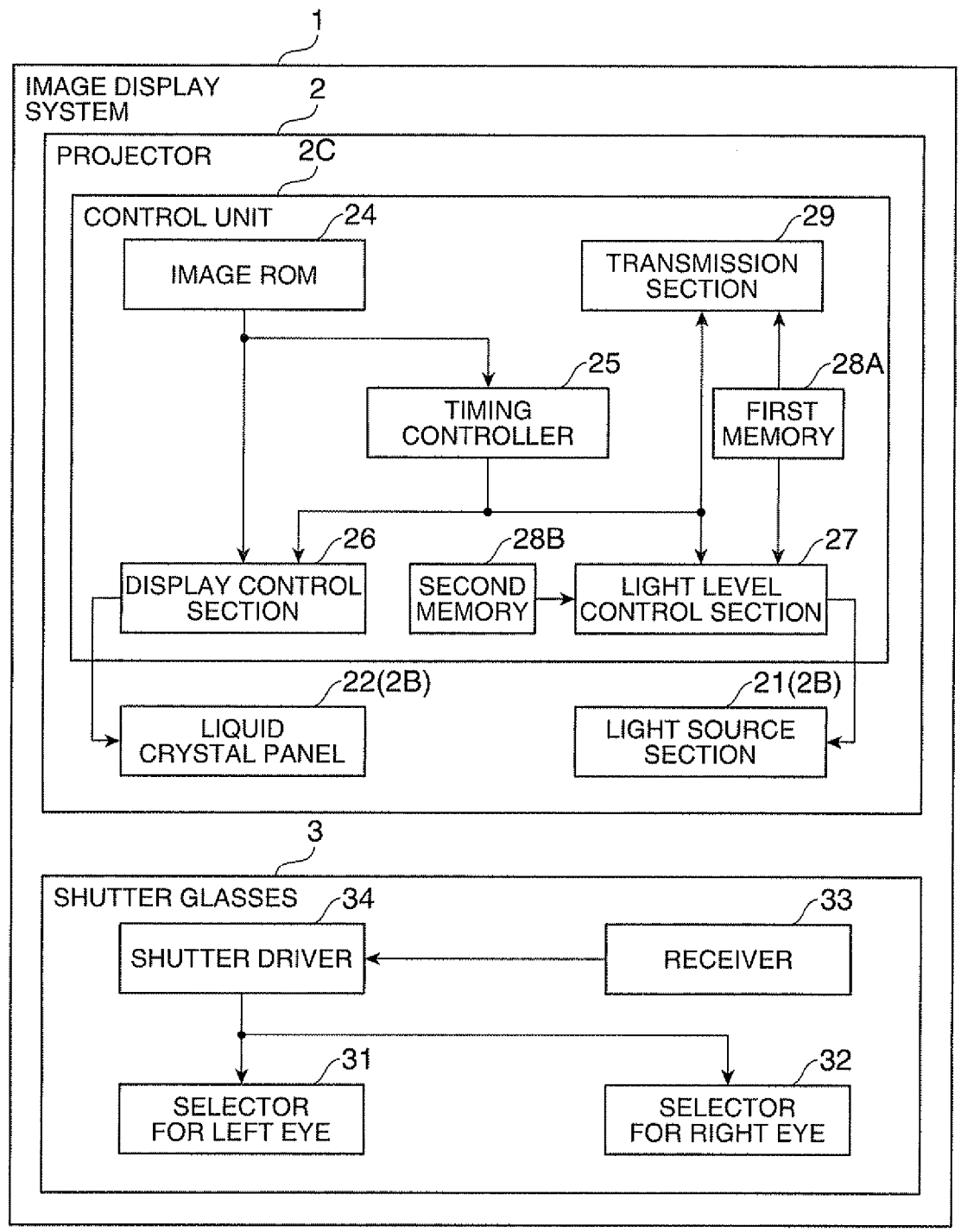
FIG. 5 is a block diagram diagrammatically showing the configuration of an image display system in a second embodiment.

FIG. 5 is a block diagram diagrammatically showing the configuration of an image display system 1 in the second embodiment.

The present embodiment differs from the first embodiment in that the control unit 2C is provided with a second memory 28B as a change information storage section that stores change information on temporal change in the transmittance of the shutter glasses 3 (selector for left eye 31 and selector for right eye 32), as shown in FIG. 5. The present embodiment also differs from the first embodiment in that the light level control section 27 operates differently in accordance with the provision of the second memory 28B.

Figure 6A:
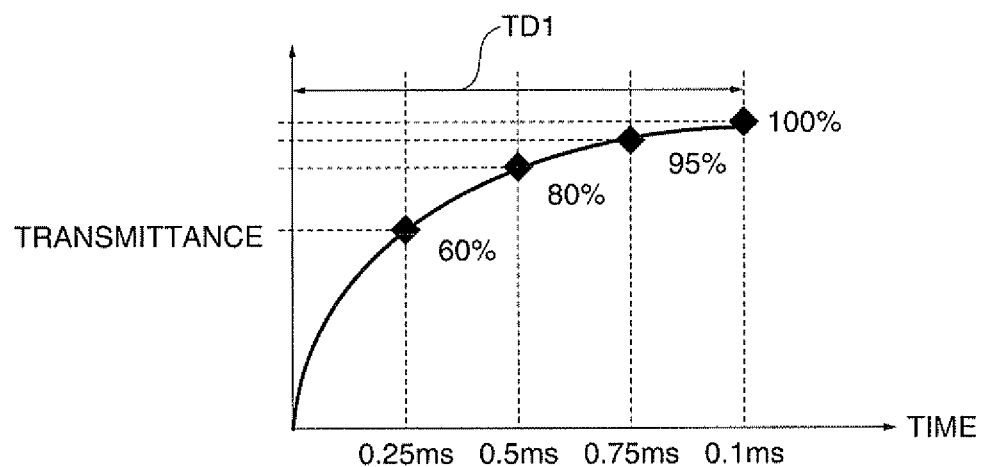
FIGS. 6A and 6B describe change information in the second embodiment.
Figure 6B:
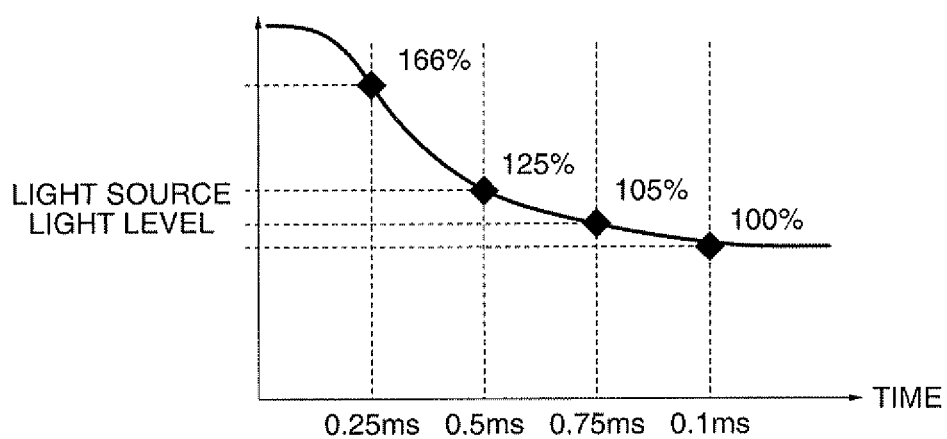

FIGS. 6A and 6B describe the change information. Specifically, FIG. 6A shows an example of temporal change in the transmittance of the shutter glasses 3 during the light blocking to transmitting transition period TD1. FIG. 6B shows the light source light level required to maintain the amount of light passing through the shutter glasses 3 (hereinafter referred to as transmission light level) at a fixed level in correspondence with FIG. 6A.

It is noted that in FIGS. 6A and 6B, the transmittance in the light transmitting state OP is set at 100% and the light source light level during periods other than the switching period TU is set at 100% for ease of description.

That is, the transmission light level during periods other than the switching period TU and at the time when the state of the shutter glasses 3 is the light transmitting state OP (hereinafter referred to as reference transmission light level) is 100% because the light source light level is 100% and the transmittance is 100%.

To maintain the transmission light level at the reference transmission light level (100%) during the light blocking to transmitting transition period TD1, it is necessary to set the light source light level at every point of time to be the reciprocal of the transmittance at the point of time.

For example, when the transmittance at several points of time of "0.25 ms," "0.5 ms," and "0.75 ms" is "60%," "80%," and "95%," it is necessary to set the light source light level at "166%," "125%," and "105%," which are reciprocals of the light source light levels at these points of time, respectively, as shown in FIGS. 6A and 6B.

The change information stored in the second memory 28B is information calculated in advance based on the temporal change in the transmittance of the shutter glasses 3 during the light blocking to transmitting transition period TD1 and the light transmitting to blocking transition period TD2.

Specifically, the change information on the light blocking to transmitting transition period TD1 is information obtained by relating the period having elapsed since the state of either of the selectors started being switched to the light transmitting state OP to the reciprocal of the transmittance at the time corresponding to the elapsed period (necessary light source light level).

Similarly, the change information on the light transmitting to blocking transition period TD2 is information obtained by relating the period having elapsed since the state either of the selectors started being switched to the light blocking state CL to the reciprocal of the transmittance at the time corresponding to the elapsed period.

The light level control section 27 then controls during the switching period TU the operation of the light source section 21 based on the change information on the light transmitting to blocking transition period TD2 in such a way that the light source light level becomes the value related to the period having elapsed since an increase start timing O1.

The light level control section 27 further controls the operation of the light source section 21 based on the change information on the light blocking to transmitting transition period TD1 in such a way that the light source light level becomes the value related to the period having elapsed since a switching point P.

The second embodiment described above provides the following advantageous effect.

In the present embodiment, the light level control section 27 adjusts the light source light level during the switching period TU based on the change information stored in the second memory 28B.

As a result, any change in the transmittance of the shutter glasses 3 during the light blocking to transmitting transition period TD1 and the light transmitting to blocking transition period TD2 can be canceled by adjusting the light source light level, whereby brightness unevenness of a projected image stereoscopically viewed through the shutter glasses 3 can be more reliably suppressed.

The invention is not limited to the embodiments described above. Changes, improvements, and other modifications can be made to the extent that the advantage of some aspects of the invention is achieved, and these changes, improvements, and other modifications fall within the scope of the invention.

In each of the embodiments described above, the image display system 1 allows the viewer to stereoscopically view displayed images formed of the first and second images as images for the left and right eyes but the image display system is not necessarily configured this way. For example, the image display system may display first and second images having contents different from each other and allow different viewers to visually recognize the two displayed images (first and second images).

When the image display system is configured as described above, the shutter glasses 3 may be replaced with the following two types of glasses: a pair of glasses having the selector for the left eye 31 provided on both sides and a pair of glasses having the selector for the right eye 32 provided on both sides.

In each of the embodiments described above, the shutter glasses 3 (selector for left eye 31 and selector for right eye 32) are formed of what are called liquid crystal shutters, but the shutter glasses 3 are not necessarily configured this way. The shutter glasses may alternatively be configured in any manner as long as the state thereof is switched between the light transmitting state OP and the light blocking state CL, for example, the state is mechanically switched between the light transmitting state and the light blocking state.

In each of the embodiments described above, the light level control section 27 adjusts the light source light level, for example, by adjusting the magnitude of current supplied to the light source section 21, but the light level control section 27 is not necessarily configured this way. For example, the light level control section 27 may control the operation of an optical aperture disposed between the light source section 21 and the liquid crystal panel 22 and blocking part of the light delivered from the light source section 21 to the liquid crystal panel 22 so that the light source light level is adjusted by adjusting the amount of blocked light.

In each of the embodiments described above, the light source section 21 includes a light source lamp of discharge light emission type, but the light source section 21 is not necessarily configured this way. The light source section 21 may alternatively include a laser diode, an LED (light emitting diode), an organic EL (electro luminescence) device, a silicon-based light emitting device, or any other variety of solid-state light emitted devices.

In each of the embodiments described above, the image display apparatus has been described only with reference to the front projection projector 2. The invention may alternatively be applied to a configuration including a screen and a rear projection projector that projects an image through the rear side of the screen.

In each of the embodiments described above, the image display apparatus is the projector 2, but the image display apparatus is not necessarily a projector. The image display apparatus may alternatively be a liquid crystal display, a plasma television, an organic EL display, or any other suitable display.

The invention can be implemented with an image display system that includes a projector or any other image display apparatus and a pair of shutter glasses and allows a viewer to view an image stereoscopically.

The entire disclosure of Japanese Patent Application No. 2010-210518, filed Sep. 21, 2010 is expressly incorporated by reference herein.

What is claimed is:

1. An image display apparatus comprising:
    a light source section;
    a light modulator that modulates light delivered from the light source section to display an image;
    a light level control section that adjusts the amount of light delivered from the light source section to the light modulator; and
    a display control section that updates the image displayed on the light modulator during a first period and a second period alternately switched therebetween in such a way that the displayed image is updated in the first period to a first image and a black image in this order and the displayed image is updated in the second period to a second image and the black image in this order,
    wherein the light level control section sets the amount of light delivered from the light source section to be greater than that in other periods during a predetermined switching period including a point when the first period is switched to the second period and vice versa, and
    the predetermined switching period overlaps at least a portion of the first period and a portion of the second period.

2. An image display system comprising:
    a pair of shutter glasses the state of which is switched between a light transmitting state in which light is transmitted and a light blocking state in which light is blocked; and
    the image display apparatus according to claim 1.

3. The image display system according to claim 2,
    wherein the image display apparatus further includes
    a period information storage section that stores light transmitting period information on a light blocking to transmitting transition period from the timing when the shutter glasses start switching the state thereof to the light transmitting state to the timing when the light transmitting state is achieved and light blocking period information on a light transmitting to blocking transition period from the timing when the shutter glasses start switching the state thereof to the light blocking state to the timing when the light blocking state is achieved, and
    a shutter control section that controls the operation of the shutter glasses,
    the shutter control section starts switching the state of the shutter glasses to the light transmitting state at the switching point and starts switching the state of the shutter glasses to the light blocking state based on the light blocking period information in such a way that the switching to the light blocking state is completed at the switching point, and
    the light level control section sets the switching period based on the light transmitting period information and the light blocking period information.

4. The image display system according to claim 3,
    wherein the image display apparatus further includes a change information storage section that stores change information on temporal change in transmittance of the shutter glasses during the light blocking to transmitting transition period and the light transmitting to blocking transition period, and
    the light level control section adjusts the amount of light delivered from the light source section based on the change information during the switching period.

5. The image display apparatus according to claim 1, wherein the predetermined switching period starts after the displayed image is updated to the black image in both the first and the second periods.

* * * * *